(12) United States Patent
VanHoose et al.

(10) Patent No.: US 11,555,561 B2
(45) Date of Patent: Jan. 17, 2023

(54) PIPE WITH AN OUTER WRAP

(71) Applicant: Advanced Drainage Systems Inc., Hilliard, OH (US)

(72) Inventors: Bill Russell VanHoose, Findlay, OH (US); Nicholas James Piazza, Findlay, OH (US); Ronald Robert Vitarelli, Marlborough, CT (US); Owen Michael Atchison, Van Buren, OH (US); Tyler James Frost, Upper Sandusky, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 17/154,262

(22) Filed: Jan. 21, 2021

(65) Prior Publication Data

US 2021/0140566 A1 May 13, 2021

Related U.S. Application Data

(60) Continuation of application No. 16/749,543, filed on Jan. 22, 2020, now Pat. No. 10,927,981, which is a
(Continued)

(51) Int. Cl.
*F16L 9/127* (2006.01)
*B29C 48/09* (2019.01)
(Continued)

(52) U.S. Cl.
CPC .......... *F16L 9/127* (2013.01); *B29C 48/0018* (2019.02); *B29C 48/09* (2019.02);
(Continued)

(58) Field of Classification Search
CPC ..... F16L 9/00; F16L 9/06; F16L 57/00; F16L 9/127; F16L 9/128; F16L 9/105; F16L 11/115
(Continued)

(56) References Cited

U.S. PATENT DOCUMENTS 3,605,232 A * 9/1971 Hines ...................... F16L 11/15
29/890.144
3,646,610 A 2/1972 Jackson
(Continued)

FOREIGN PATENT DOCUMENTS

CA 2548267 7/2005
GB 550448 A 1/1943
(Continued)

OTHER PUBLICATIONS

Extended European Search Report for European Application No. EP 20213943.2, dated Mar. 23, 2021 (13 pages).
(Continued)

*Primary Examiner* — Patrick F Brinson
(74) *Attorney, Agent, or Firm* — Finnegan, Henderson, Farabow, Garrett & Dunner LLP

(57) ABSTRACT

This disclosure relates generally to corrugated pipe, and more particularly to corrugated pipe with an outer wrap. In one embodiment, a pipe includes an axially extended bore defined by a corrugated outer wall having axially adjacent, outwardly-extending corrugation crests, separated by corrugation valleys. The pipe also includes an outer wrap applied to the outer wall. The outer wrap may include fibers and plastic. The outer wrap may span the corrugation crests producing a smooth outer surface.

18 Claims, 3 Drawing Sheets

Related U.S. Application Data continuation of application No. 15/594,859, filed on May 15, 2017, now Pat. No. 10,550,963, which is a division of application No. 14/732,146, filed on Jun. 5, 2015, now Pat. No. 9,759,354.

(51) Int. Cl.

| | | |
|---|---|---|
| *B29C 48/00* | (2019.01) | |
| *F16L 58/10* | (2006.01) | |
| *F16L 9/06* | (2006.01) | |
| *F16L 11/115* | (2006.01) | |
| *B29C 48/285* | (2019.01) | |
| *B29C 48/151* | (2019.01) | |
| *B29C 48/03* | (2019.01) | |
| *B29C 63/00* | (2006.01) | |
| *F16L 9/10* | (2006.01) | |
| *F16L 9/128* | (2006.01) | |
| *B29K 309/08* | (2006.01) | |
| *F16L 9/02* | (2006.01) | |
| *F16L 9/08* | (2006.01) | |
| *F16L 9/12* | (2006.01) | |
| *F16L 58/02* | (2006.01) | |

(52) U.S. Cl.
CPC .......... *B29C 48/131* (2019.02); *B29C 48/151* (2019.02); *B29C 48/2883* (2019.02); *B29C 48/2886* (2019.02); *B29C 63/0004* (2013.01); *F16L 9/06* (2013.01); *F16L 9/105* (2013.01); *F16L 9/128* (2013.01); *F16L 11/115* (2013.01); *F16L 58/1063* (2013.01); *B29C 48/001* (2019.02); *B29K 2309/08* (2013.01); *F16L 9/02* (2013.01); *F16L 9/085* (2013.01); *F16L 9/12* (2013.01); *F16L 58/02* (2013.01)

(58) Field of Classification Search
USPC ....... 138/121, 122, 109, 155, 120, 137, 141, 138/129, 130, 173; 285/374, 399; 428/36.9, 36.91
See application file for complete search history.

(56) References Cited

U.S. PATENT DOCUMENTS

| | | | |
|---|---|---|---|
| 4,053,269 A | | 10/1977 | Levy |
| 4,269,234 A | | 5/1981 | Johnson et al. |
| 4,751,799 A | | 6/1988 | Ditcher et al. |
| 4,779,651 A | * | 10/1988 | Hegler .................. F16L 37/02 285/903 |
| 4,862,924 A | * | 9/1989 | Kanao .................... F16L 11/16 138/144 |
| 5,354,521 A | | 10/1994 | Goodman |
| 5,678,610 A | | 10/1997 | Scarazzo |
| 5,705,351 A | | 1/1998 | Sahasrabudhe |
| 5,914,163 A | | 6/1999 | Browne |
| 6,186,183 B1 | | 2/2001 | Lepoutre |
| 6,399,002 B1 | * | 6/2002 | Lupke ................ F16L 25/0063 264/173.17 |
| 6,497,956 B1 | | 12/2002 | Phillips et al. |
| 6,578,608 B2 | * | 6/2003 | Hegler ................ F16L 25/0045 138/155 |
| 6,688,339 B2 | | 2/2004 | Yamaguchi et al. |
| RE38,508 E | | 4/2004 | Wright |
| 6,889,715 B2 | | 5/2005 | Fraser et al. |
| 6,899,140 B2 | | 5/2005 | Fraser et al. |
| 6,926,853 B2 | | 8/2005 | Hinc et al. |
| 6,955,780 B2 | | 10/2005 | Herrington |
| 7,093,638 B2 | | 8/2006 | Bonaventura |
| 7,156,128 B1 | * | 1/2007 | Kanao .................... F16L 11/112 138/143 |
| 7,200,973 B2 | | 4/2007 | Tunis |
| 7,204,286 B2 | | 4/2007 | Kasai et al. |
| 7,297,740 B2 | | 11/2007 | Dyksterhouse |
| 7,484,535 B2 | * | 2/2009 | Goddard ................ B29C 48/21 138/121 |
| 7,842,149 B2 | | 11/2010 | Glejbøl et al. |
| 7,946,312 B2 | | 5/2011 | Sheldrake |
| 7,987,885 B2 | | 8/2011 | Zhou et al. |
| 8,025,834 B2 | | 9/2011 | Miller et al. |
| 8,118,064 B2 | | 2/2012 | Nakajima et al. |
| 8,152,949 B2 | | 4/2012 | Bailey et al. |
| 8,172,484 B2 | | 5/2012 | Tsukamoto |
| 8,505,587 B2 | | 8/2013 | Glejbol et al. |
| 8,678,042 B2 | | 3/2014 | Quigley et al. |
| 8,685,537 B2 | | 4/2014 | Imai et al. |
| 8,697,806 B2 | | 4/2014 | Michie, Jr. et al. |
| 8,733,405 B2 | * | 5/2014 | Goddard ................ F16L 57/00 138/121 |
| 8,747,098 B1 | | 6/2014 | Johnson et al. |
| 8,758,539 B2 | | 6/2014 | Venero et al. |
| 8,763,647 B2 | | 7/2014 | Quigley et al. |
| 8,820,800 B2 | * | 9/2014 | Sutton ................ F16L 25/0054 285/903 |
| 8,820,801 B2 | | 9/2014 | Sutton et al. |
| 10,077,857 B2 | * | 9/2018 | VanHoose ............ B29C 48/131 |
| 2003/0090112 A1 | * | 5/2003 | Baughman ............ F16L 39/005 285/903 |
| 2003/0178082 A1 | | 9/2003 | Yamaguchi et al. |
| 2004/0007279 A1 | | 1/2004 | Yamaguchi et al. |
| 2004/0099324 A1 | | 5/2004 | Fraser |
| 2007/0062595 A1 | | 3/2007 | Bhatnagar et al. |
| 2008/0210327 A1 | | 9/2008 | Goddard et al. |
| 2009/0114304 A1 | | 5/2009 | Mohri et al. |
| 2009/0127852 A1 | * | 5/2009 | Sutton ................ F16L 25/0054 285/374 |
| 2010/0224306 A1 | | 9/2010 | Sutton et al. |
| 2014/0076450 A1 | | 3/2014 | Glejbol |

FOREIGN PATENT DOCUMENTS

| | | |
|---|---|---|
| GB | 2424935 A | 10/2006 |
| WO | WO 1994/28694 A1 | 12/1994 |
| WO | WO 2005/063465 A1 | 7/2005 |

OTHER PUBLICATIONS

Examination Report in corresponding Canadian Patent Application No. 2,988,114, dated Oct. 12, 2022 (4 pages).

* cited by examiner

PIPE WITH AN OUTER WRAP

CROSS-REFERENCE TO RELATED PATENT APPLICATIONS

This application is a continuation application of U.S. patent application Ser. No. 16/749,543, filed Jan. 22, 2020, which is a continuation application of U.S. patent application Ser. No. 15/594,859, filed May 15, 2017 (now U.S. Pat. No. 10,550,963), which is a divisional application of U.S. patent application Ser. No. 14/732,146, filed on Jun. 5, 2015 (now U.S. Pat. No. 9,759,354), the disclosures of which are incorporated herein by reference in their entireties.

TECHNICAL FIELD

This disclosure relates generally to pipe, and more particularly to pipe with an outer wrap, including systems and methods for making the same.

BACKGROUND

Corrugated pipe is commonly used for drainage of soil and transportation of surface water. The corrugations typically create a pipe profile with steep sides and deep valleys. Given that these pipes are typically constructed using plastic, the corrugations may provide necessary structural integrity for the pipe by providing needed radial stiffness.

However, the valleys of the corrugated pipe may also require inconvenient construction accommodations. For example, corrugated pipe may require additional work to backfill. Filling material may not readily conform to the corrugated exterior, requiring additional work to fill the valleys of the exterior wall. Triple wall corrugated pipe may include an outer layer of plastic, which may produce a less capricious outer surface. However, triple wall pipe suffers from increased cost, weight, and thickness. For example, the outer layer of a triple wall pipe may require additional material, adding significant production material costs and resulting in a heavier pipe.

It is thus apparent that the need exists for a corrugated pipe having an outer wall or layer that may be lighter in weight, stronger, cheaper to produce, more efficient to construct, and exhibit a narrower width and a lower profile.

SUMMARY

In one embodiment, a pipe includes an axially extended bore defined by a corrugated outer wall having axially adjacent, outwardly-extending corrugation crests, separated by corrugation valleys. The pipe also includes an outer wrap applied to the outer wall. The outer wrap may include fibers and plastic. The outer wrap may span the corrugation crests producing a smooth outer surface.

In one embodiment, a method of applying an outer wrap to a corrugated pipe is disclosed. The method may include receiving a corrugated pipe that is cut to length. The method may also include determining a wrap type to be applied to the corrugated pipe. The method may further include determining a flow rate for applying a wrap of the wrap type based on a type of plastic used in the wrap, a type of fiber used in the wrap, and the wrap type. Additionally, the method may include applying a wrap made of the type of fiber and the type of plastic to the corrugated pipe using the determined flow rate producing a smooth outer surface.

In one embodiment, a pipe may include an axially extended bore defined by an outer wall. The bore may include plastic. The pipe may also include an outer wrap applied to the outer wall. The outer wrap may include plastic. Also, the outer wrap may be applied in an overlapping helical pattern completely covering the outer wall.

In one embodiment, a method of applying an outer wrap to a corrugated pipe id disclosed. The method may include receiving an uncut corrugated pipe from a pipe extrusion device. The method may also include determining a wrap type to apply to the uncut corrugated pipe. Additionally, the method may include determining a flow rate for applying a wrap of the wrap type based on a type of plastic used in the wrap, a type of fiber used in the wrap, and the wrap type. The method may further include applying a wrap made of the type of fiber and the type of plastic to the corrugated pipe using the determined flow rate producing a smooth outer surface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

While standard corrugated pipe often suffers from increased jobsite backfill work, the pipe could be covered by a material to produce a smooth, but strong, exterior wall. For example, wrapping standard corrugated pipe in a material may result in an exterior wall without valleys which may eliminate gaps in the soil when placed in the ground at a jobsite, solving backfill problems. The outer wrap of the present invention may solve the backfill problems associated with dual wall corrugated pipe while not adding significant thickness to the pipe wall. The outer wrap material may also increase the strength of the pipe.

An outer wrap may also allow additional pipe configurations because the wrap may consist of different materials than the pipe. For example, selected wrap material may allow manufacturers to reduce costs, while increasing strength, even though the particular wrap material may result in a heavier pipe. Other wrap materials may increase the strength to weight ratio of the pipe. Additional properties of alternative wrap materials may allow manufacturers to more effectively design wrapped pipe solutions to meet design constraints.

Illustrative embodiments of the present disclosure are listed below. In one embodiment, an exemplary corrugated pipe with an outer wrap is disclosed. In another embodiment, an exemplary process for making corrugated pipe with an outer wrap is disclosed. The products and processes disclosed may be used in combination or separately. For example, the disclosed process may be used to make additional products. Further, disclosed products may be manufactured using additional processes.

Figure 1:
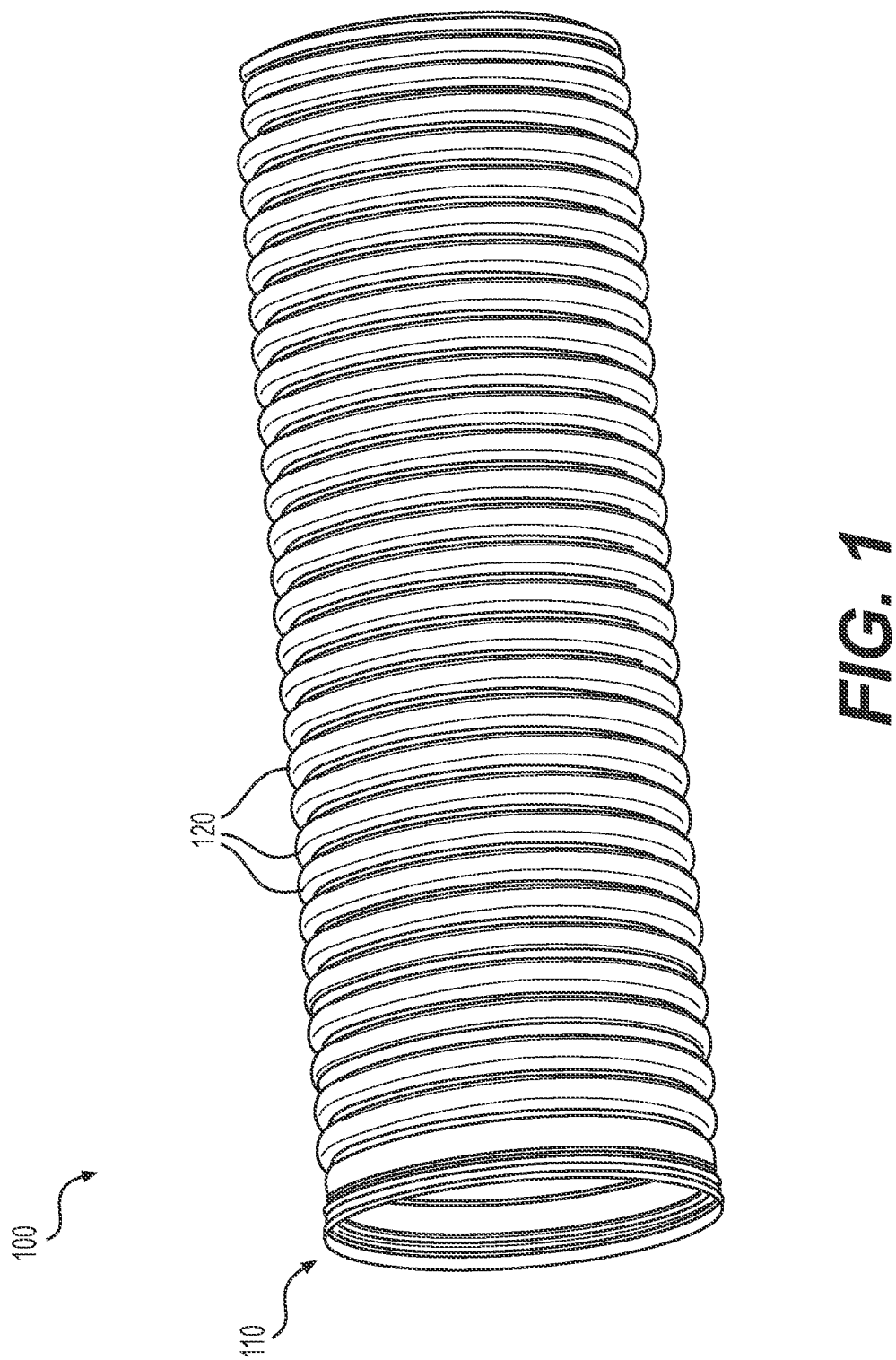
FIG. 1 illustrates an exemplary corrugated pipe according to some embodiments of the present disclosure.

FIG. 1 illustrates an exemplary corrugated pipe according to some embodiments of the present disclosure. Corrugated pipe 100 may be conventional single wall pipe or dual wall pipe that is well known in the art. Additional types of pipe may serve as corrugated pipe 100 consistent with this disclosure.

Corrugated pipe 100 may include a corrugated outer wall. For example, corrugated pipe 100 may include a series of corrugations 120. Corrugations 120 may run the length of corrugated pipe 100. In an embodiment, corrugations 120 may form spiral corrugations or annular corrugations. For example, corrugations 120 could spiral in the longitudinal around the circumference of the pipe. Corrugated pipe 100 may connect to other pipes. In an embodiment, corrugated pipe 100 may include bell 110 to facilitate connections to other pipes. For example, bell 110 may surround and contain a spigot end of another pipe. The spigot may have a smaller outer diameter than the bell, so that the spigot may fit into bell 110. Other connection types may be used with corrugated pipe 100. For example, a coupler may be used to connect to other pipes.

In an embodiment, corrugated pipe 100 may have an inner wall. For example, corrugated pipe may be a dual wall pipe. A smooth inner wall surface may be necessary or desirable for certain applications. Accordingly, a dual wall pipe, which includes a smooth inner wall may be used to satisfy design constraints. For example, a smooth inner wall may be necessary to meet pipe strength requirements or to satisfy flow path specifications. When specifications require a consistent pipe inner diameter, plans may rely on dual wall pipe having an inner wall. In other embodiments, corrugated pipe may be a single wall pipe.

Corrugated pipe 100 may be made of plastic. In an embodiment, the material of corrugated pipe 100 may include plastic or thermoplastic polymers. For example, corrugated pipe may be made of high density polyethylene (HDPE) or polypropylene (PP). Corrugated pipe 100 may alternatively comprise a variety of other materials including, for example, other plastics, metals, or composite materials.

While FIG. 1 describes corrugated pipe 100, other pipe types may be used consistent with this disclosure. In an embodiment, ribbed pipe may be wrapped. In other embodiments, pipes having any profile may be wrapped.

Figure 2:
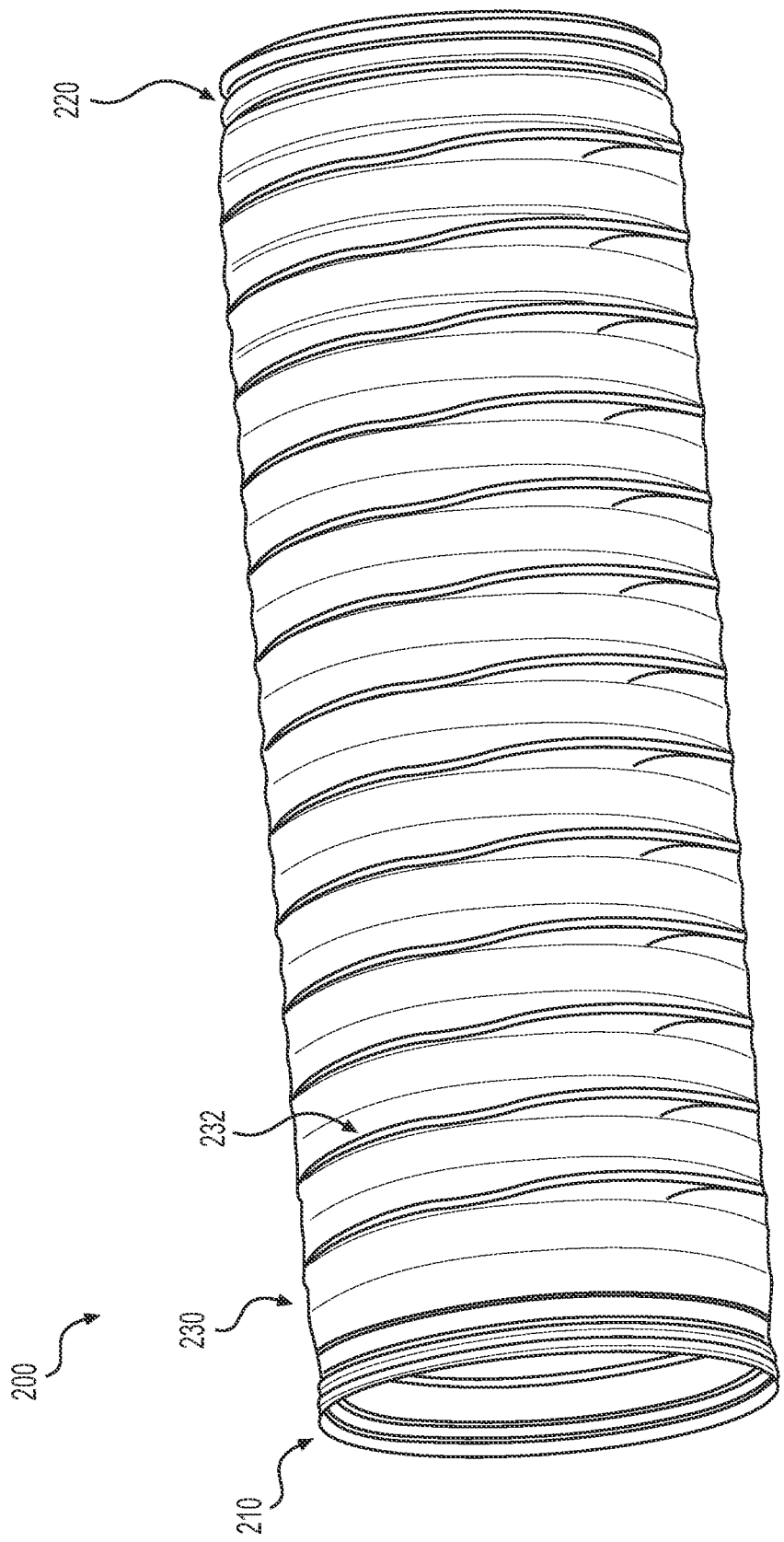
FIG. 2 illustrates an exemplary corrugated pipe having an outer wrap according to some embodiments of the present disclosure.

FIG. 2 illustrates an exemplary corrugated pipe having an outer wrap according to some embodiments of the present disclosure. Wrapped pipe 200 may include integrated bell 210, similar to corrugated pipe 100. While not depicted, various bell designs may be used, such as a proud bell, for example. A proud bell may have an outer diameter that is larger than the outer diameter of the corrugated pipe body. Proud bells have an advantage over integrated bells in that they may be joined to a pipe end having a cross section matching that of the corrugated pipe body, rather than a specific spigot end. Therefore, the proud bell may connect to pipe cut to any length. However, integrated bells may be preferable to proud bells in underground applications, because integrated bells lie on grade in a trench. Conversely, proud bells may require the digging of "bell holes" to excavate additional space in the trench to accommodate the larger outer diameter of the proud bell. As illustrated, wrapped pipe 200 may include spigot 220 to connect to bells of other pipes.

Wrapped pipe may use, for example, corrugated pipe 100 with outer wrap 230 applied. In an embodiment of the present disclosure, outer wrap 230 may form a spiral pattern. For example, outer wrap 230 may be applied as a helix (e.g., helical wrap 232) around corrugated pipe 100.

Outer wrap 230 may be formed using fibers and plastic. In an embodiment, fibers (e.g., fiberglass or carbon fibers) may be embedded in plastic. Polymers such as high density polyethylene (HDPE), polypropylene (PP), or polyvinyl chloride (PVC) may be used as the plastic. Other fibers or plastics may be used consistent with this disclosure.

In an embodiment, wrapped pipe may have a pipe and wrap of different materials. For example, a pipe may be made of HDPE and a wrap may be made of fiber reinforced HDPE. This combination of materials may result in an increased strength to weight ratio because the product may be manufactured such that higher quality materials may be located more efficiently within the product.

In another example wrapped pipe, the corrugations may be made of a cheaper material. Higher quality materials may be used for the outer wrap and/or the liner. Higher quality materials may have a higher elastic and flexural modulus, better resistance to stress cracking, impact performance, and abrasion resistance, for example. When corrugations are made from a different material than the liner and/or the outer wrap, the corrugations may be manufactured using a material with additives that reduce cost at the relative expense of structural integrity.

In another embodiment, outer wrap 230 may use continuous strand fiber. The fibers may run from a reel, embedding unbroken strands in a helix that wraps the pipe. For example, spools of fiberglass thread may provide uninterrupted strands of fiberglass for embedding in plastic around a pipe. Continuous strand fiber may result in wrapped pipe with greater resilience than other wrap types.

In an embodiment, outer wrap 230 may use non-continuous fiber. Pelletized or short segments of fiber may be embedded in plastic. For example, short fiber strands of 0.25 to 1 inch in length may be used. By configuring the feed of the molten plastic as the fiber strands are embedded in plastic, the fiber strands may align semi-oriented to the flow path as they are embedded in plastic. For example, the fibers may be oriented linear to the flow path (e.g., circumferentially to the pipe) with minor deviations in the fiber orientation. In an embodiment, semi-oriented may mean that more fibers would align parallel to the flow path than perpendicular to the flow path. For example, semi-oriented fiber may lay, on average, at an angle less than 45 degrees from the direction of the flow path.

In an embodiment, the molten plastic may be pulled at a rate higher than the extruder flow rate to further orient the fiber stands in the direction of the flow. The fiber orientation may vary based on the type of fiber used, the length of the fibers, the diameter of the pipe to be wrapped, the type of plastic that the fibers are to be embedded in, and the thickness of the outer wrap.

In an embodiment, outer wrap 230 may use fiberglass impregnation. Pelletized or short segments of fiber may be embedded in plastic with no deliberate orientation, which may result in an isotropic material, which may have uniform structural integrity in all directions. By reducing the flow rate of the material through the die and/or reducing pulling (e.g., stretching) of the material as it exits the die, manufacturers may reduce the orientation of fiber strands in the outer wrap.

In another embodiment, outer wrap 230 may not use fibers. Plastic may be applied to corrugated pipe 100 by itself. For example, HDPE may be wrapped onto a pipe in a helix to create a smooth outer layer. The temperature and flow rate of the plastic may be dependent upon the thickness of the wrap, the diameter of the pipe, and the type of material used in the plastic wrap without fiber. Example flow rates may range from 10 to 30 feet per minute.

Outer wrap 230 may run the length of the pipe. When coupling mechanisms at the ends of the pipe require specific materials, outer wrap 230 may span the length of the corrugations, ending just before coupling mechanisms, such as bell 210 or spigot 220, for example. Further, pipes may be wrapped in portions or segments as a particular application may require.

In an embodiment, wrap 230 may wrap bell 210 completely and end at spigot 220. For example, bell 210 may be completely covered. In another embodiment, both bell 210 and spigot 220 may not be wrapped. When a continuous wrap process is used, a mechanism may be used to remove the wrap from spigot 220 and/or bell 210 as desired, regardless of the bell type.

Figure 3:
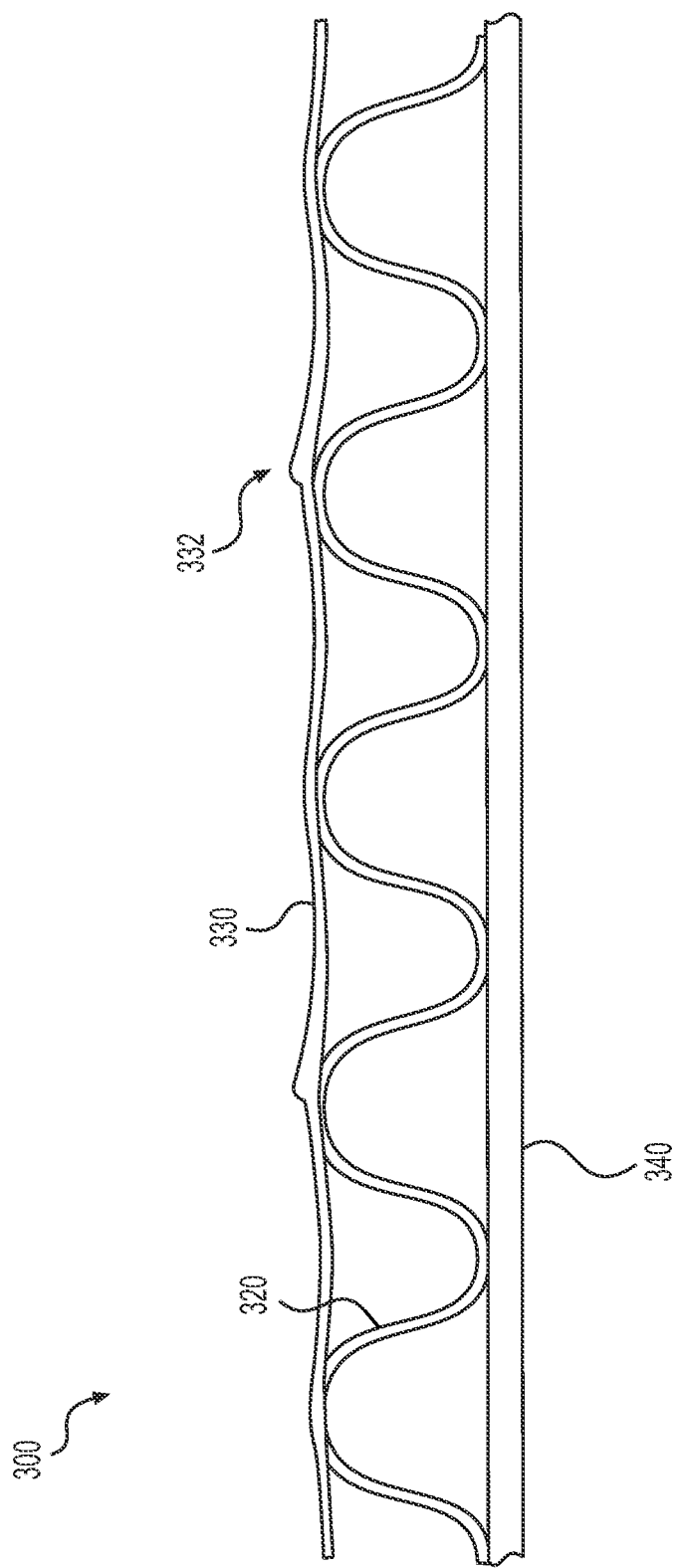
FIG. 3 illustrates a cross-sectional view of an exemplary corrugated pipe having an outer wrap according to some embodiments of the present disclosure.

FIG. 3 illustrates a cross-sectional view of an exemplary corrugated pipe having an outer wrap according to some embodiments of the present disclosure. Pipe profile 300 may include liner 340 and corrugation layer 320. These two layers may form a dual wall pipe. In some embodiments, liner 340 may not be used, and corrugation layer 320 may form a single wall pipe that is wrapped. The outer wrap may form third wall 330. For example, third wall 330 may be a layer of fibers embedded in plastic.

In an embodiment, the wrap may be applied in a helix, producing third wall edge 332 that may be generated from the overlap of the helix. For example, the corrugated pipe may be rotated as the wrap is applied down the length of the pipe. This process may apply the outer wrap as a spiral. To ensure adequate coverage by the wrap, each spiral may slightly overlap, producing third wall edge 332.

In an embodiment, the wrap material may bond with the pipe material. For example, the outer wrap and corrugation materials may be welded together by heating the materials to their thermoplastic state and pressing them together. Some materials used for the outer wrap and the corrugations may allow the use of solvent cements or epoxies to bond the wrap to the corrugations.

In an embodiment, the wrap material may be secured to the pipe by the tension of the wrap. Certain wrap and corrugation materials may not bond well together. For example, when dissimilar materials are used, such as an outer wrap made of PP and a corrugated pipe made of HDPE, a friction fit may secure the wrap to the corrugated pipe. The frictional forces may be strong enough such that the materials may appear to be attached. However, the wrap may separate from the pipe with less force than when the wrap is welded to the pipe.

In some embodiments, an outer wrap may be applied using a manufacturing process in accordance with some embodiments of the present disclosure. The steps discussed below and their order are merely exemplary. Steps may be performed in other orders. Further, certain steps may be omitted or duplicated consistent with this disclosure.

In an embodiment, a pipe may be formed in a corrugator. For example, a dual wall pipe may be formed. An exemplary pipe having an inner liner layer with a second corrugated layer is produced using known processes. In an embodiment, a single wall pipe with only a corrugated layer may be produced. In an embodiment, pipe may be formed using a mandrel, such as ribbed pipe. Other embodiments may utilize pipe having any profile.

After the pipe is formed, the pipe may be cut to length. For example, the corrugated pipe may be cut to its final length or a usable length so that the pipe may be transferred to the outer wrap die.

In an embodiment, instead of the pipe being cut to length, the outer wrap may be applied in-line. For example, the uncut corrugated pipe may continue directly to the outer wrap die assembly. The die assembly may apply the outer wrap in the pipe production line. The die may rotate around the stationary pipe after it exits the corrugator to apply the outer wrap.

Control equipment may determine a wrap type. In an embodiment, a computer controller may control the flow and application of the outer wrap extrusion die. For example, the die may apply oriented continuous strand fiber, semi-oriented non-continuous fiber, fiberglass impregnation, or no fiber with the plastic. The die may allow the wrap type to be changed.

The die assembly may wrap the pipe. In an embodiment, a corrugated pipe may be placed adjacent to a filament die. The pipe may be rotated as it moves past the openings of the filament die. The rotation and traversal of the pipe in relation to the die assembly may be controlled so that the ribbon extruded from the die assembly forms a continuous outer layer.

In an embodiment, the pressure, temperature, and type of materials used in the extrusion process may be altered based on the wrap type. For example, the temperature or flow rate may alter the wrap. For example, for HDPE temperatures ranging from 350 to 450 degrees Fahrenheit may be used to heat the wrap material for extrusion. The die may extrude plastic at a width ranging from 4 to 20 inches. When the wrap is applied as a helix, the pitch of the helix may be determined based on the outer circumference of the pipe and the width of the extruded plastic. The die may also switch from continuous to non-continuous fiber. The switching process may be substantially automated by use of mechanical automation tools to change the sources of materials or die settings.

Control equipment may also determine the thickness of the wrap layer. The control equipment may facilitate a particular flow rate of wrap material (e.g., the flow rate(s) plastic and/or fiber). Control equipment may also provide a particular wrap thickness by controlling the feed rate pulling the extruded material. For example, manufacturing equipment may pull extruded outer wrap (e.g., plastic or plastic with fibers) twice as fast as the material is extruded. When the ratio of the pull rate to the extrusion flow rate is greater than 1:1, the outer wrap material may stretch as it is applied to the pipe. Various pull to feed ratios may be used to control the thickness of the outer wrap. Moreover, a higher pull to feed ratio (e.g., increased pulling of the outer wrap) may result in increased alignment of the fiber strands, when they are embedded in the plastic of the wrap. When using continuous strand fiber, pulling the outer wrap material may have greater limitations. For example, lower pull to feed ratios may need to be used. In an example wrapped pipe, a corrugated HDPE pipe may be wrapped by heating fiber reinforced HDPE to a temperature of 350 to 450 degrees Fahrenheit for extruding at a rate of 20 feet per minute (e.g., plus or minus 5 feet per minute). The wrap material may be pulled at a ratio of 5:4, for example, relative to the extrusion rate. When the pipe may have an inconsistent outer diameter, such as pipes with proud bells, for example, the rotational velocity of the pipe may vary to provide a consistent linear velocity at the outer diameter.

After wrapping is complete, the wrapped pipe may be held for cooling. Additional post-wrap processes may include removal of any wrap material over the spigot and/or the bell. For example, the exterior surface of the spigot may need to remain unwrapped to properly connect with other pipes. In order to remove the wrapping, should the wrapping process cover the spigot, a mechanism may cut the wrap covering the spigot and remove the wrap, exposing the exterior surface of the spigot. In some embodiments, the wrap process may not wrap the spigot, which may eliminate the need for a removal step.

The specification has described pipe with an outer wrap. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A pipe, comprising:
    an axially extended bore defined by a corrugated outer wall having axially adjacent, outwardly-extending corrugation crests connected by corrugation valleys, the corrugation crests and valleys forming a continuous cross-section;
    an outer wrap applied to the outer wall, the outer wrap spanning the corrugation crests producing a smooth outer surface;
    a bell at a first end of the bore; and
    a spigot at a second end of the bore, wherein the outer wrap spans the length of the corrugation crests and ends before the bell and the spigot.

2. The pipe of claim 1, wherein the spigot comprises a smaller outer diameter than an outer diameter of the bell.

3. The pipe of claim 1, wherein the bell comprises a proud bell having a larger outer diameter than the outer diameter of the bore.

4. The pipe of claim 1, wherein the bell comprises an integrated bell.

5. The pipe of claim 1, wherein the outer wrap comprises fibers and plastic.

6. The pipe of claim 5, wherein the fiber comprises continuous strand fiberglass.

7. The pipe of claim 5, wherein the fiber comprises continuous strand carbon fiber.

8. The pipe of claim 5, wherein the fiber comprises short strands of fiberglass.

9. The pipe of claim 8, wherein the short strands of fiberglass have a length ranging from about 0.25 inches to about 1 inch.

10. A pipe, comprising:
    an axially extended bore defined by a corrugated outer wall having axially adjacent, outwardly-extending corrugation crests connected by corrugation valleys, the corrugation crests and valleys forming a continuous cross-section;
    an outer wrap applied to the outer wall, the outer wrap spanning the corrugation crests producing a smooth outer surface, wherein the outer wrap comprises fibers and plastic;
    a bell at a first end of the bore; and
    a spigot at a second end of the bore,
    wherein the outer wrap spans the length of the corrugation crests and ends before the bell and the spigot, and
    wherein the spigot comprises a smaller outer diameter than an outer diameter of the bell.

11. The pipe of claim 10, wherein the pipe further comprises a liner spanning the corrugation valleys.

12. The pipe of claim 10, wherein the bell comprises a proud bell having a larger outer diameter than the outer diameter of the bore.

13. The pipe of claim 10, wherein the bell comprises an integrated bell.

14. The pipe of claim 10, wherein the fiber comprises continuous strand fiberglass.

15. The pipe of claim 10, wherein the fiber comprises continuous strand carbon fiber.

16. The pipe of claim 10, wherein the fiber comprises short strands of fiberglass.

17. The pipe of claim 16, wherein the short strands of fiberglass have a length ranging from about 0.25 inches to about 1 inch.

18. The pipe of claim 10, wherein the bore and the outer wrap are made of different materials.

* * * * *